Oct. 25, 1960  M. H. SIDEBOTHAM, SR., ET AL  2,957,379
STRIP CUTTING MECHANISM
Original Filed Jan. 20, 1955  2 Sheets-Sheet 1
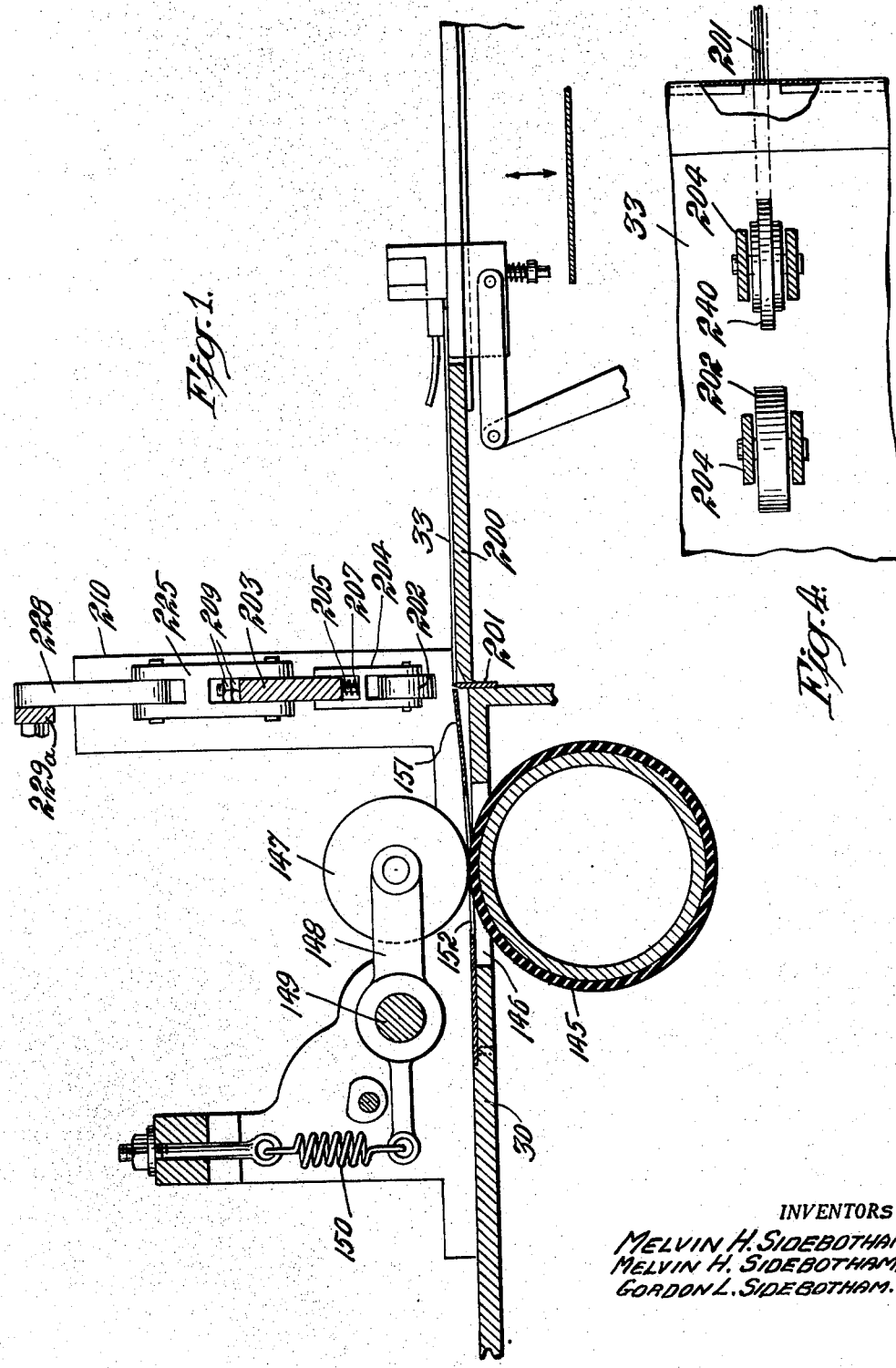
INVENTORS
MELVIN H. SIDEBOTHAM, SR.
MELVIN H. SIDEBOTHAM, JR.
GORDON L. SIDEBOTHAM, JR.

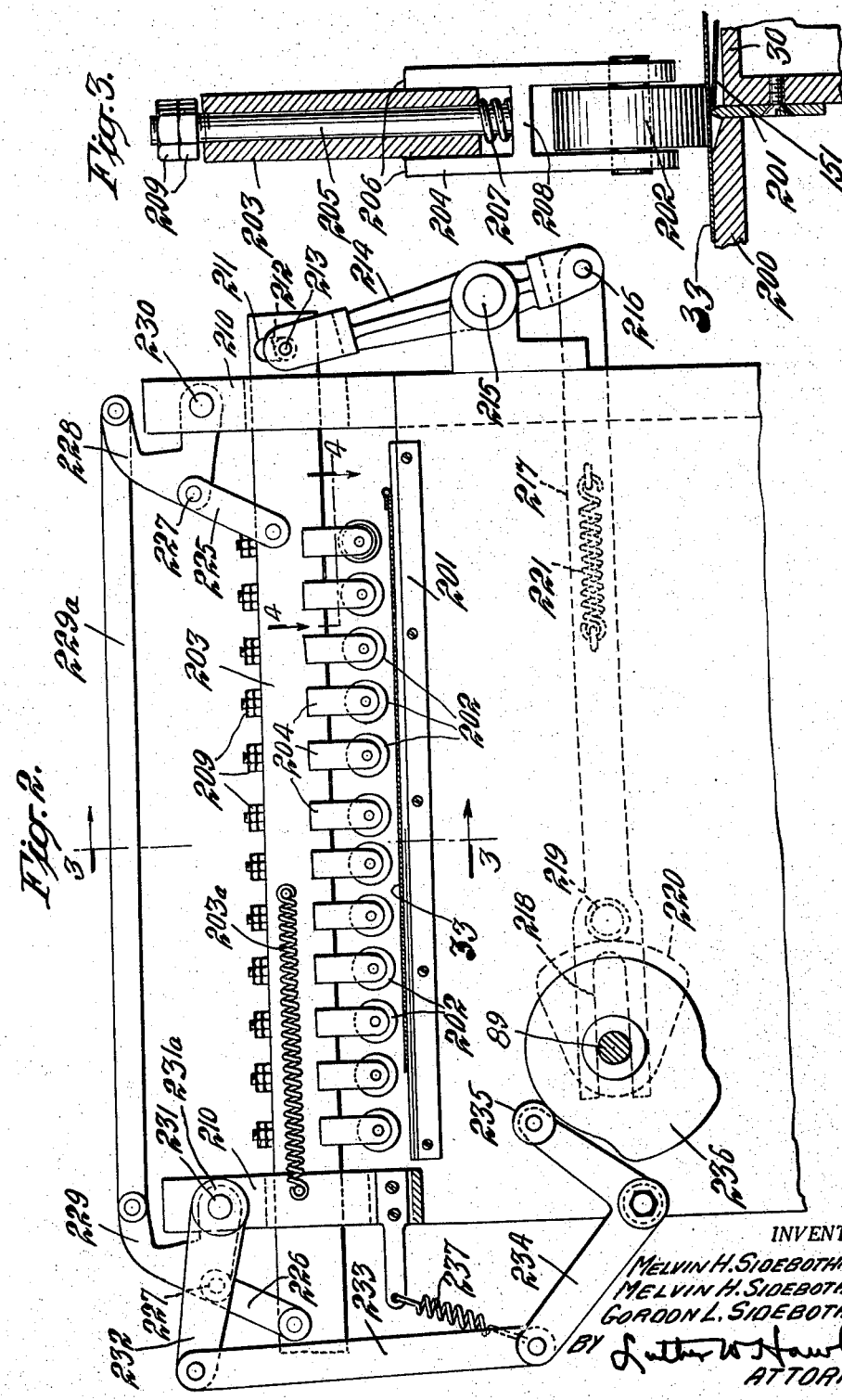

United States Patent Office 2,957,379
Patented Oct. 25, 1960

2,957,379

STRIP CUTTING MECHANISM

Melvin H. Sidebotham, Sr., Gordon L. Sidebotham, and Melvin H. Sidebotham, Jr., Winchester, Mass., assignors, by mesne assignments, to Joseph Dixon Crucible Company, Jersey City, N.J., a corporation of New Jersey Original application Jan. 20, 1955, Ser. No. 482,931. Divided and this application Feb. 7, 1956, Ser. No. 563,897

2 Claims. (Cl. 83—422)

This invention relates to strip cutting mechanism and this application is a division of application Serial No. 482,931, filed January 20, 1955, now Patent No. 2,898,-824.

The invention has for its salient object to provide practical and efficient strip or sheet cutting mechanism.

Further objects of the invention will appear from the following specification taken in connection with the drawings which form a part of this application and in which Fig. 1 is a sectional elevation showing the strip feed roller and cutter for cutting the strip into sheets;

Fig. 2 is an elevational view of the strip cutter;

Fig. 3 is a sectional elevation, on an enlarged scale, taken substantially on line 3—3 of Fig. 2, looking in the direction of the arrows; and Fig. 4 is a sectional elevation, on an enlarged scale, taken substantially on line 4—4 of Fig. 2, looking in the direction of the arrows.

In the particular embodiment of the invention illustrated, there is shown a table 30 which supports the strip 33. The strip passes over a feed roller 145 which is mounted beneath an opening 146 in the table and extends upwardly in the opening to contact a plurality of rollers 147 which are carried by arms 148 pivoted at 149 and have secured to their outer ends springs 150 which hold the rollers 147 downwardly to press the paper strip between the rollers 147 and the roller 145. The arms 148 are engaged by suitable means to permit the rollers 147 to be intermittently urged toward the rollers 145 to grip the strip 33 therebetween whereby the rollers 145 when rotated will move the strip toward the right as seen in Figure 1.

The delivery end of the table 30 has mounted in a recess in the upper surface, a plate 151 which guides the paper strip over a blade 201 to a table 200. The plate 151 has openings 152 to receive the rollers 145 and 147.

As shown in Fig. 1, the strip has been fed from the table 30 to the table 200. In passing from the table 30 to the table 200, as above described, the strip passes over the stationary knife 201 and the strip is cut by the action of a plurality of rollers mounted above the knife and above the strip, these rollers being movable downwardly and transversely to press the strip against the knife, thus cutting the strip into sheets.

As shown in Fig. 2, a plurality of rollers 202 are carried by a bar 203, the rollers being mounted in the bar in the manner shown in Fig. 3. Each roller is mounted in a bracket 204 having an upwardly extending pin 205 which is slidably mounted in the bar 203. The bracket 204 has extensions 206 which guide the bracket in the upward movement thereof, and a spring 207 surrounds the pin 205 and is disposed between the lower edge of the bar 203 and a transverse abutment member 208 in the bracket. Nuts 209 engage the upper end of the pin 205 and hold the pin in position on the bar.

The bar 203 is slidably mounted in vertically extending members 210 and the bar is also capable of vertical movement as well as longitudinal movement in the supporting members 210. The longitudinal movement on the bar is accomplished in the following manner. At one end of the bar there is disposed a slot 211 which receives a roller 212 mounted on a pin 213 carried by the upper end of a lever 214 which is mounted on a fixed pivot 215. The lower end of the lever has pivoted thereto at 216, a pitman link 217 which has a bifurcated end 218 which straddles a shaft 89. The pitman carries a roller 219 which engages a cam 220 mounted on the shaft 89, and a spring 221 holds the roller in engagement with the cam. This longitudinal movement of the bar 203 is accomplished after the bar has been lowered so that the rollers 202 will engage the upper surface of the strip. A spring 203a assists in returning the bar to its initial position shown in Fig. 2. The bar is raised and lowered in the following manner. Links 225 and 226 are pivoted at the bar at their lower ends and at their upper ends are pivoted at 227 to U-shaped links 228 and 229 which are connected by a link 229a. These links are pivoted to the members 210 at 230 and 231. The link 229 is fixed at 231 to a spindle 231a which has secured thereto an arm 232 connected by a link 233 to an L-shaped lever 234 which has at one end a roller 235 which engages a cam 236 on the shaft 89. A spring 237 holds the roller in engagement with the cam. As the cam is rotated, the lever 234 is moved in an anti-clockwise direction, a downward pull will be exerted on the link 233 and the arm 232, thus causing the spindle 231a to swing the U-shaped link 229 in an anti-clockwise direction, which will cause the bar 203 to be lowered. When the bar has been lowered, the cam 220 will actuate the pitman link 217 and through the lever 214 will cause the bar 203 to be moved transversely across the strip, thus severing the strip into sheets. From the showing in Fig. 4 it will be noted that the right hand roller, which is designated 240, is narrower than the other rollers 202, so that when the bar and rollers are moved to the right, the roller 240 will pass between the leads which have been sealed in spaced relation under the folded edge of the sheet 33.

It will be clear from the foregoing description that the cutting mechanism described will sever the strip cleanly and efficiently. After the sheet 33 has been severed from the strip it is fed to the center of the table 200 by a pair of clamps 245 mounted on bars 246 slidably mounted on the table 200. The clamps have guide fingers 248 to guide the paper strip beneath the clamps. This structure is more fully described and claimed in the parent application Serial No. 482,931 of which this application is a division, and since it forms no part of the present invention further illustration and description is unnecessary in this application.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What we claim is:

1. In apparatus of the character described, a fixed elongated horizontal bed for supporting a strip of material movable longitudinally thereon, a stationary knife blade including a vertically extending linear cutting edge normal to the longitudinal axis of the bed for receiving the strip of material thereover, mechanically driven intermittent feed means mounted transversely of said bed for moving the strip material longitudinally thereon a predetermined distance relative to said cutting edge, mechanically driven pressure applying means mounted over said bed for receiving the strip material during dwell periods of said intermittent feed means, said pressure applying means comprising a plurality of co-planar spaced rollers normally overlying and in the plane of said cutting edge and on axes of rotation parallel to the longitudinal axis of said bed and normal to and spaced substantially along the entire length of said cutting edge, and operating means operatively connected to said rollers and including force transmitting means sequentially lowering said rollers into pressure engagement on said cutting edge and a second force transmitting means moving said rollers longitudinally of said cutting edge a distance substantially equal to the spacing between adjacent rollers for severing the strip material in timed sequence with operation of the intermittent feed means.

2. In the apparatus of claim 1, wherein said rollers are resiliently urged toward said cutting edge for equalizing the pressure applied by said rollers when the same are lowered prior to longitudinal movement thereof across said cutting edge.

References Cited in the file of this patent

UNITED STATES PATENTS

| Number | Name | Date |
|---|---|---|
| 594,507 | Williams | Nov. 30, 1897 |
| 646,206 | Du Brul | Mar. 27, 1900 |
| 683,272 | Gleim | Sept. 24, 1901 |
| 879,153 | Dirr et al. | Feb. 18, 1908 |
| 1,196,986 | Roney | Sept. 5, 1916 |
| 1,204,961 | Eaby | Nov. 14, 1916 |
| 1,208,019 | Roney | Dec. 12, 1916 |
| 1,469,325 | MacDonald | Oct. 2, 1923 |
| 1,511,228 | Lund | Oct. 14, 1924 |
| 1,643,680 | Schutz | Sept. 27, 1927 |
| 2,110,190 | Anderson | Mar. 8, 1938 |
| 2,235,532 | Reardon | Mar. 8, 1941 |
| 2,287,004 | Wheeler | June 16, 1942 |
| 2,293,178 | Stocker | Aug. 18, 1942 |
| 2,359,034 | Grandstedt | Sept. 26, 1944 |
| 2,405,867 | Wheeler | Aug. 13, 1946 |

FOREIGN PATENTS

| Number | Country | Date |
|---|---|---|
| 677,100 | Great Britain | Aug. 6, 1952 |

UNITED STATES PATENT OFFICE
CERTIFICATION OF CORRECTION

Patent No. 2,957,379                            October 25, 1960

Melvin H. Sidebotham, Sr., et al.

It is hereby certified that error appears in the above numbered patent requiring correction and that the said Letters Patent should read as corrected below.

In the drawings, Sheets 1 and 2, lower right-hand corner, name of inventor, for "Gordon L. Sidebotham, Jr.", each occurrence, read -- Gordon L. Sidebotham --.

Signed and sealed this 2nd day of May 1961.

(SEAL)
Attest:

ERNEST W. SWIDER
Attesting Officer

DAVID L. LADD
Commissioner of Patents